Sept. 19, 1961 F. O. RINGLEB 3,000,401
BOUNDARY LAYER FLOW CONTROL DEVICE
Filed Jan. 29, 1960

INVENTOR.
Friedrich O. Ringleb
BY
Arthur L. Collins
ATTORNEY

United States Patent Office 3,000,401
Patented Sept. 19, 1961

3,000,401
BOUNDARY LAYER FLOW CONTROL DEVICE
Friedrich O. Ringleb, 22 NW. New Jersey Ave.,
Woodbury Heights, N.J.
Filed Jan. 29, 1960, Ser. No. 5,569
10 Claims. (Cl. 138—39)
(Granted under Title 35, U.S. Code (1952), sec. 266)

The invention described herein may be manufactured and used by or for the Government of the United States of America for governmental purposes without the payment of any royalties thereon or therefor.

This is a continuation-in-part application of application, Serial No. 659,192 filed May 14, 1957 and now abandoned.

This invention relates to the control of the flow of fluids, gases as well as liquids, along structural surfaces such as aircraft wings and fuselages, bodies of revolution, ducts and diffusers.

It is known that fluid flow along a structural surface adheres to the surface such that its velocity at the surface is zero and such that the velocity in general increases toward a finite value outside the boundary layer as the boundary layer is traversed. It is also known that two basic types of flow exist, laminar flow and turbulent flow. The laminar type of flow consists of a smooth gliding phenomenon wherein smoke or dyes when injected from small openings into the fluid stream are carried downstream in sharp regular streamlines. The turbulent type of flow is characterized by random particle movement or agitation such that the streamlines are irregular and not visible when smoke or dye is injected.

Along a smooth polished surface a flow can be maintained laminar if its velocity increases in the flow direction. At rapidly decreasing flow velocities, however, transition to a turbulent state together with flow separation from the surface occurs. Under such a flow condition there is therefore a point along the flow path where a particle or particles leave the surface. Behind the point the flow direction is opposite to that immediately upstream from the point. Only at very slight decreasing flow velocities can a flow be maintained laminar and even then for only limited distances along the surface.

Where separation occurs, the flow sometimes re-attached to the surface downstream from the turbulent flow area to form a closed area in which the fluid may swirl or rotate. Where no re-attachment occurs, the fluid downstream from the separation point normally moves in a violent irregular manner. The separation point itself also sometimes changes its position on the surface in an irregular manner often in a general upstream direction.

It is well known that the drag and lift characteristics of a surface vary and depend upon the nature of the flow thereover. A non-separating laminar flow along a surface normally provides minimum drag and maximum lift under otherwise equal conditions. Separation increases turbulence. Turbulence increases drag. Separation increases the drag and decreases the lift. This change is usually a sudden and discontinuous one, a phenomenon known as the stall. Due to the irregular motion of the separation point along the surface, irregular changes of drag and lift often occur.

The character of a flow over a surface and therefore the drag and lift characteristics of the surface can often be influenced by so-called boundary layer control devices. Some such devices involve suction through slots or porous surface areas and blowing through slots along the surface in the flow direction. With suction type devices the flow which tends to pile up where velocities over the surface decrease is removed. With blowing type devices the flow is accelerated downstream. With either said boundary layer control device separation can be prevented. Suction or blowing, however, requires considerable energy in order to be effective and high energy devices are bulky and heavy. Low suction rates are effective only in the case of porous surfaces which offer considerable structural complications. Therefore, automatic boundary layer control devices without power requirements are of considerable importance.

The present invention provides improved automatic boundary layer control devices and techniques which are based on the following considerations. Since separation never occurs as long as the flow velocity is increasing in the flow direction the improved structure of the present invention provides a leading surface along which the flow will continually increase. The leading surface is then terminated in a cusp. A cavity under the cusp joins a trailing surface so as to provide a step for the flow. A particularly important feature of this step is the knife-edged cusps with its 360 degree angle. The cusp acts in a manner similar to the sharp trailing edge of an airfoil in preventing the flow from passing around the edge and downwardly along the surface of the cavity. It permits the flow to leave the surface at its well defined cusp point with a finite velocity different from zero. The streamline which leaves the cusp point tangentially in general meets or becomes re-attached to the wall of the cavity or the trailing surface to provide an enclosed flow area in which a fluid vortex is formed. Even in cases where the flow separates and fails to re-attach, it has been found that the separation point tends to remain fixed rather than move upstream. A suitably designed cavity, however, will assure the re-attachment phenomenon and the formation of a vortex within the enclosed area. As will be more fully disclosed hereinafter auxiliary devices such as lips, vanes, walls, may also be used to facilitate the re-attachment and the formation of the vortex.

One object of this invention is therefore to provide a surface contour which will prevent separation of an airstream from a surface.

Another object of this invention, therefore, is to prevent stalling of an airplane due to too high angles of attack of an airstream on an airfoil.

Another object of this invention is to provide a means for keeping a fluid, which is flowing with increasing pressure over a surface attached to the surface.

Other objects and many of the attendant advantages of this invention will be readily appreciated as the same becomes better understood by reference to the following detailed description when considered in connection with the accompanying drawing wherein.

Figure 1:
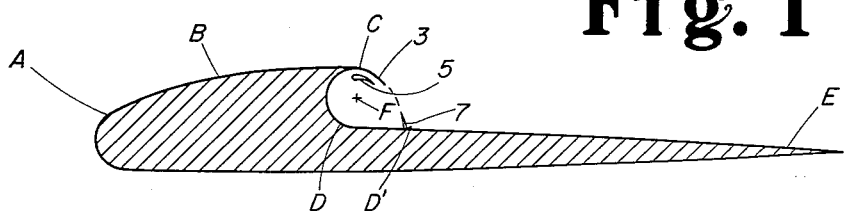
FIG. 1 is a cross-sectional view of a surface provided with the cusp embodying this invention.

An airfoil which is constructed in accordance with a preferred embodiment of the present invention is illustrated in FIG. 1 of the drawing. As shown therein, the structural body or airfoil over which the air or other fluid flows is preferably designed such that in horizontal flight the upper surface of the body slopes generally upwardly between the points A and B and downwardly if at all only slightly between the points B and C. Under these conditions the velocity of the fluid from right to left is not substantially reduced at any point as it flows from A to C and a boundary layer separation of the airstream from the airfoil surface will not normally occur. The flow velocity at C therefore approaches a maximum value. At point C the leading surface of the airfoil, which extends between points A and C meets the generally concave circular surface C—D to form a cusp. In so doing, it will be noted in FIG. 2 of the drawing that the trailing edge of the leading surface A—C and the upper edge of the circular surface C—D meet a common tangent at the common point of intersection C. The lower edge of the circular surface C—D and the leading edge of the trailing surface which extends between points D and E meet and substantially form a 180 degree angle at D. The lip or the like 3 which extends downstream from C generally in the direction of fluid flow over the cusp, the vane or the like 5 which is preferably disposed within the cavity behind the cusp generally in parallelism with the circular surface C—D, and the wall or the like 7 which extends upwardly from the stagnation point D' on the trailing surface D—E, each promote and guarantee the formation and stabilization of a fluid vortex in the cavity with its fluid center at F. The design and disposition of the lip, the vane, and the wall will be more exactly defined hereinafter in connection with the description of FIG. 2 of the drawing.

In operation, fluid flows over the airfoil between its leading edge A—C and the cusp point C normally with either an increasing velocity or with a velocity which remains substantially unchanged. Flow of the fluid or airstream over and beyond the cusp point C generates a fluid vortex having stagnation point or center in the cavity behind the cusp as shown at F. The vortex remains in equilibrium or stabilized in the cavity due to the design characteristics of the leading surface, the cusp, the cavity and the trailing surface and/or due to the presences of lip 3, the vane 5, and/or the wall 7. Formation of the stabilized vortex in the cavity C—D facilitates a flow over the upper surface of the airfoil at increased angles of attack and therefore increases its potential lift. In doing this, it has been observed that the fluid vortex acts as a roller bearing in directing the airstream in a manner from the leading surface adjacent the cusp point C to the trailing surface without a boundary layer separation therealong.

Figure 2:
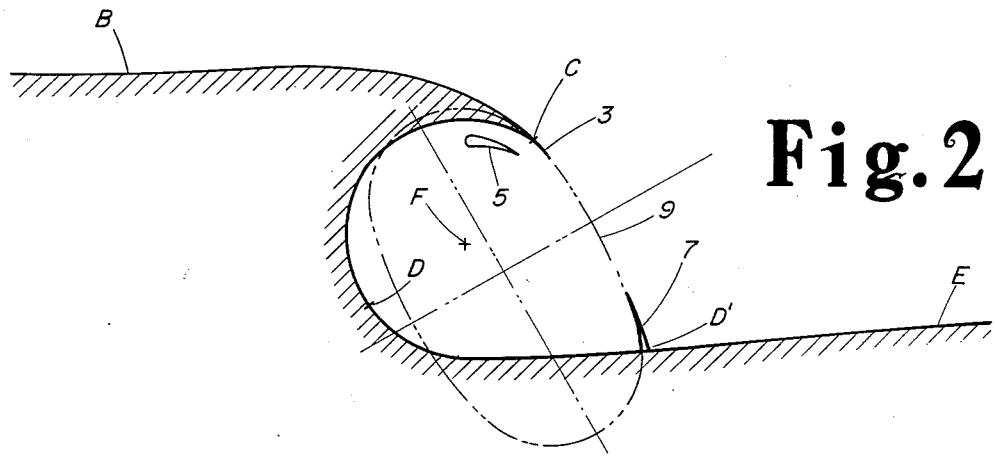
FIG. 2 is a cross-sectional view of an improved section of an airfoil constructed in accordance with the present invention wherein the mode of design thereof is illustrated in greater detail.

As is shown in detail in FIG. 2 of the drawing, the general contour and disposition of the lip 3, the vane 5, and the wall 7 are defined by the ellipse 9 which is constructed such that the cusp point C on the airfoil surface coincides with a point on the ellipse, the radius of curvature of the ellipse at the cusp point C is substantially equal to the radius of the circular surface C—D, and the trailing surface D—E of the airfoil intersects the ellipse envelope at D' substantially at a right angle.

In accordance with one method of design of an airfoil which is capable of forming and trapping a fluid vortex in a cavity between its leading and trailing surfaces, a suitable ellipse is first constructed. A point C on the ellipse preferably adjacent an intersection of its major axis with its envelope is then selected. A circular arc or surface C—D, having a radius which is substantially defined by the radius of curvature of the ellipse at the selected point C is then constructed. The leading surface A—C of the airfoil is then designed such that a boundary layer separation will not develop therealong at a predetermined angle of attack. The leading surface is also constructed such that it meets the circular surface C—D at C to form a cusp. The trailing surface D—E of the airfoil is then designed such that it meets circular surface at D substantially at a 180 degree angle and such that it intersects the envelope of the ellipse at D' substantially at a right angle.

Although design of the airfoil in the above described manner will normally of itself allow formation of the trapped fluid vortex behind the circular surface or cavity C—D, it has been found that additional structural features of the airfoil may be provided to facilitate and better guarantee the formation and stabilization of the vortex in the cavity. One such structural feature of the airfoil takes the form of a curvilinear lip or the like 3 which extends downstream from the cusp C and substantially follows curvature of the ellipse. Another structural feature of the airfoil which facilitates establishment of the trapped vortex takes the form of a wall or the like 7 which extends upwardly from the trailing surface at its point of intersection D' with the ellipse and substantially follows the curvature of said ellipse envelope. Still another structural feature of the airfoil which aids in the formation of the trapped vortex takes the form of a vane or the like 5 which is disposed within the cavity substantially concentric with the circular surface C—D and/or the envelope of the ellipse. It has been found that any one or more of the above described structural features of the airfoil substantially promote and assure the formation of the trapped fluid vortex within the cavity.

A cusp which is constructed on a wing surface of an airplane according to the conditions set forth above as illustrated in FIG. 2 will have great value in that the pilot of a plane landing in a small area, such as the flight deck of an aircraft carrier, will safely cut his landing speed to a great extent by increasing the angle of attack without the danger of stalling the plane. This makes for easier and safer landings.

Figure 3:
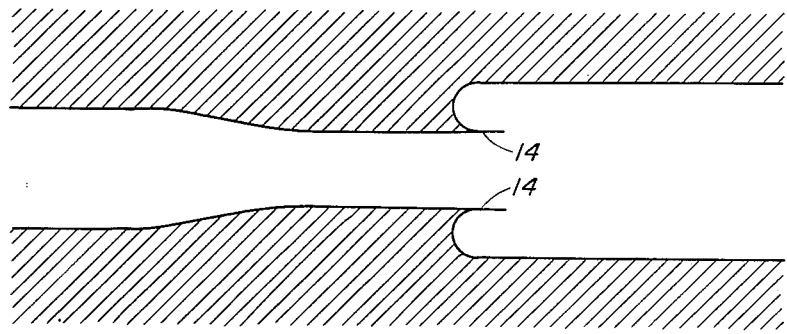
FIG. 3 is a cross-sectional view of a portion of a duct showing the cusp formation therein.

The cusp effect described here can also be applied wherever a flow is to be led from a lower to a higher pressure or vice versa, as for example, to shorten the diffuser of a wind tunnel, or, in ducts and pipes as illustrated at 14 in FIG. 3 to prevent separation of the flow at turns and bends. If one cusp-step is not sufficient to reach the required pressure difference, two or more such steps may be applied in the same way.

Obviously many modifications and variations of the present invention are possible in the light of the above teachings. It is, therefore, to be understood that within the scope of the appended claims the invention may be practiced otherwise than as specifically described.

What is claimed is:

1. A structure over which a fluid flows said structure comprising a leading surface; a trailing surface; a curvilinear surface interposed between said leading and trailing surfaces, said leading surface and said curvilinear surface being contoured to substantially form a cusp at their juncture; and a lip extending downstream from the cusp generally in the direction of fluid flow over the cusp.

2. A structure over which a fluid flows said structure comprising a leading surface; a trailing surface; a curvilinear surface interposed between said leading and trailing surfaces, said curvilinear surface having a substantially constant radius of curvature, said leading surface and said curvilinear surface being contoured to substantially form a cusp at their juncture; and a lip extending downstream from the cusp, the contour of said lip substantially following a portion of an ellipse which includes a point that coincides with the cusp, which has a radius of curvature at said point substantially equal to the radius of curvature of the curvilinear surface, and which intersects the trailing surface to substantially form a right angle.

3. A structure over which a fluid flows said structure comprising a leading surface; a trailing surface; a curvilinear surface interposed between said leading and trailing surfaces, said leading surface and said curvilinear surface being contoured to substantially form a cusp at their juncture; and a wall which extends upwardly from a point on the trailing surface where a streamline of the fluid flow over the cusp meets the trailing surface.

4. A structure over which a fluid flows said structure comprising a leading surface; a trailing surface; a curvilinear surface interposed between said leading and trailing surfaces, said curvilinear surface having a substantially constant radius of curvature, said leading surface and said curvilinear surface being contoured to substantially form a cusp at their juncture; and a wall which extends upwardly from the trailing surface, the disposition and contour of the wall being substantially defined by a portion of an ellipse which includes a point that coincides with the cusp, which has a radius of curvature at said point substantially equal to the radius of curvature of the curvilinear surface, and which intersects the trailing surface to substantially form a right angle.

5. A structure over which a fluid flows said structure comprising a leading surface; a trailing surface; a curvilinear surface interposed between said leading and trailing surfaces, said leading surface and said curvilinear surface being contoured to substantially form a cusp at their juncture; and a vane disposed within the concavity formed by the leading surface, the curvilinear surface and the trailing surface, said vane being substantially in parallelism with said curvilinear surface.

6. A structure over which a fluid flows said structure comprising a leading surface; a trailing surface; a curvilinear surface interposed between said leading and trailing surfaces, said curvilinear surface having a substantially constant radius of curvature, said leading surface and said curvilinear surface being contoured to substantially form a cusp at their juncture; and a vane disposed within the concavity formed by the leading surface, the curvilinear surface and the trailing surface, said vane being substantially in parallelism with a portion of an ellipse which includes a point that coincides with the cusp, which has a radius of curvature at said point substantially equal to the radius of curvature of the curvilinear surface, and which intersects the trailing surface to substantially form a right angle.

7. A structure over which a fluid flows said structure comprising a leading surface; a trailing surface; a curvilinear surface interposed between said leading and trailing surfaces, said curvilinear surface having a substantially constant radius of curvature, said leading surface and said curvilinear surface being contoured to substantially form a cusp at their juncture; a lip extending downstream from the cusp; and a wall which extends upwardly from the trailing surface, the contour of the lip and the wall substantially following portions of an ellipse which includes a point that coincides with the cusp, which has a radius of curvature at said point substantially equal to the radius of curvature of the curvilinear surface, and which intersects the trailing surface to substantially form a right angle.

8. A structure over which a fluid flows said structure comprising a leading surface; a trailing surface; a curvilinear surface interposed between said leading and trailing surfaces, said curvilinear surface having a substantially constant radius of curvature, said leading surface and said curvilinear surface being contoured to substantially form a cusp at their juncture; a lip extending downstream from the cusp; and a vane disposed within the concavity formed by the leading surface, the curvilinear surface and the trailing surface, said vane being substantially in parallelism with the curvilinear surface, the contour of the lip substantially following a portion of an ellipse which includes a point that coincides with the cusp, which has a radius of curvature at said point substantially equal to the radius of curvature of the curvilinear surface, and which intersects the trailing surface to substantially form a right angle.

9. A structure over which a fluid flows said structure comprising a leading surface; a trailing surface; a curvilinear surface interposed between said leading and trailing surfaces, said curvilinear surface having a substantially constant radius of curvature, said leading surface and said curvilinear surface being contoured to substantially form a cusp at their juncture; a vane disposed within the concavity formed by the leading surface, the curvilinear surface and the trailing surface, said vane being substantially in parallelism with the curvilinear surface, and a wall which extends upwardly from the trailing surface, the disposition and contour of the wall being substantially defined by a portion of an ellipse which includes a point that coincides with the cusp, which has a radius of curvature at said point substantially equal to the radius of curvature of the curvilinear surface, and which intersects the trailing surface to substantially form a right angle.

10. A structure over which a fluid flows said structure comprising a leading surface; a trailing surface; a curvilinear surface interposed between said leading and trailing surfaces, said curvilinear surface having a substantially constant radius of curvature, said leading surface and said curvilinear surface being contoured to substantially form a cusp at their juncture; a lip extending downstream from the cusp; a vane disposed within the concavity formed by the leading surface, the curvilinear surface and the trailing surface, said vane being substantially in parallelism with the curvilinear surface; and a wall which extends upwardly from the trailing surface, the contour of the lip and the wall substantially following portions of an ellipse which includes a point that coincides with the cusp, which has a radius of curvature at said point substantially equal to the radius of curvature of the curvilinear surface, and which intersects the trailing surface to substantially form a right angle.

References Cited in the file of this patent

UNITED STATES PATENTS

| | | |
|---|---|---|
| 1,580,577 | Baumann | Apr. 13, 1926 |
| 2,037,940 | Stalker | Apr. 21, 1936 |
| 2,375,180 | Vigo | May 1, 1945 |
| 2,899,150 | Ellis | Aug. 11, 1959 |

FOREIGN PATENTS

| | | |
|---|---|---|
| 441,523 | France | May 29, 1912 |
| 476,258 | Great Britain | Dec. 6, 1937 |
| 988,727 | France | May 9, 1951 |